(12) United States Patent
Kaku et al.

(10) Patent No.: US 11,736,380 B2
(45) Date of Patent: Aug. 22, 2023

(54) SWITCH OR RELAY DEVICE FOR A RING NETWORK, THE SWITCH CONFIGURED TO DETECT AND CORRECT DUPLICATION OF SWITCH IDENTIFICATIONS

(71) Applicant: DENSO CORPORATION, Kariya (JP)

(72) Inventors: Yoshifumi Kaku, Kariya (JP); Shinya Ishibashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 324 days.

(21) Appl. No.: 16/928,603

(22) Filed: Jul. 14, 2020

(65) Prior Publication Data
US 2021/0029016 A1 Jan. 28, 2021

(30) Foreign Application Priority Data

Jul. 22, 2019 (JP) ................................. 2019-134564

(51) Int. Cl.
*H04L 45/02* (2022.01)
*H04L 49/102* (2022.01)
*H04L 12/42* (2006.01)
*H04L 101/622* (2022.01)

(52) U.S. Cl.
CPC .............. *H04L 45/02* (2013.01); *H04L 12/42* (2013.01); *H04L 49/102* (2013.01); *H04L 2101/622* (2022.05)

(58) Field of Classification Search
CPC ....... H04L 45/02; H04L 12/42; H04L 49/102; H04L 2101/622; H04L 12/403; H04L 47/32; H04L 47/34
See application file for complete search history.

(56) References Cited

U.S. PATENT DOCUMENTS

| | | | | |
|---|---|---|---|---|
| 4,506,360 A | * | 3/1985 | Kryskow, Jr. | ......... H04L 12/417 370/216 |
| 4,677,615 A | | 6/1987 | Orimo et al. | |
| 4,881,074 A | * | 11/1989 | Reichbauer | ............. H04L 12/42 370/258 |
| 4,984,233 A | * | 1/1991 | Nakayashiki | ........... H04L 12/42 370/453 |
| 5,012,468 A | * | 4/1991 | Siegel | ................. H04L 12/4035 370/454 |
| 5,280,478 A | * | 1/1994 | Yang | ..................... H04L 12/433 370/452 |

(Continued)

FOREIGN PATENT DOCUMENTS

JP 2018-148506 A 9/2018

*Primary Examiner* — Ayaz R Sheikh
*Assistant Examiner* — Tarell A Hampton
(74) *Attorney, Agent, or Firm* — Posz Law Group, PLC

(57) ABSTRACT

A relay device, or a switch, in a ring network corrects connection information including (i) identification information of respective switches in the network and (ii) a connection order of other switches seen from a subject switch, by storing in a memory a switch ID table of the subject switch, which includes an ID of each of the other switches and a connection order of the other switches seen from the subject switch, for identifying an abnormal section of the network, for example. Each of the switches has a function that (i) generates anew ID for the restarted switch for generating a new ID table and (ii) causes the other switches to generate a respective new switch ID table, when detecting switch ID duplication among the switches or when restarting from a reset.

10 Claims, 9 Drawing Sheets

(56) References Cited

U.S. PATENT DOCUMENTS

| | | | | |
|---|---|---|---|---|
| 5,283,571 A * | 2/1994 | Yang | H04L 41/00 | 340/9.16 |
| 5,291,491 A * | 3/1994 | Hutchison | H04L 12/4625 | 370/453 |
| 5,319,644 A * | 6/1994 | Liang | H04L 12/42 | 370/452 |
| 5,327,534 A * | 7/1994 | Hutchison | H04L 41/00 | 370/402 |
| 5,363,366 A * | 11/1994 | Wisdom, Jr | H04L 12/433 | 370/452 |
| 5,363,493 A * | 11/1994 | Unverrich | H04L 41/26 | 709/224 |
| 5,383,178 A * | 1/1995 | Unverrich | H04L 43/00 | 370/252 |
| 5,390,188 A * | 2/1995 | Dawson | H04L 43/045 | 714/717 |
| 5,539,725 A * | 7/1996 | Trubey | H04L 12/433 | 370/258 |
| 6,314,488 B1 * | 11/2001 | Smith | H04L 12/4637 | 710/316 |
| 6,611,521 B1 * | 8/2003 | McKay | H04W 72/005 | 370/461 |
| 7,599,315 B2 * | 10/2009 | Cornet | H04L 12/42 | 709/224 |
| 2003/0095549 A1 * | 5/2003 | Berman | H04L 45/30 | 370/392 |
| 2004/0047298 A1 * | 3/2004 | Yook | H04L 61/5038 | 370/254 |
| 2005/0007962 A1 * | 1/2005 | Nam | H04L 61/5092 | 370/254 |
| 2005/0097255 A1 * | 5/2005 | Barenys | G06F 13/4286 | 710/316 |
| 2009/0268746 A1 * | 10/2009 | Ogasahara | H04L 12/4637 | 370/406 |
| 2013/0216227 A1 | 8/2013 | Naito et al. | | |
| 2015/0016473 A1 * | 1/2015 | Wakabayashi | H04L 9/40 | 370/474 |
| 2017/0041161 A1 | 2/2017 | Kaku | | |

* cited by examiner

FIG. 2

| PREAMBLE | DEST MAC ADR | SENDER MAC ADR | TYPE | DATA | FCS |
|---|---|---|---|---|---|
| 8 BYTE | 6 BYTE | 6 BYTE | 2 BYTE | 46 – 1500 BYTE | 4 BYTE |

| P1 | ID52 | ID53 | ID54 |
|----|------|------|------|
| P2 | ID54 | ID53 | ID52 |

77

SWITCH OR RELAY DEVICE FOR A RING NETWORK, THE SWITCH CONFIGURED TO DETECT AND CORRECT DUPLICATION OF SWITCH IDENTIFICATIONS

CROSS REFERENCE TO RELATED APPLICATION

The present application is based on and claims the benefit of priority of Japanese Patent Application No. 2019-134564, filed on Jul. 22, 2019, the disclosure of which is incorporated herein by reference.

TECHNICAL FIELD

The present disclosure generally relates to a switch or a relay device in a ring network as part of an in-vehicle communication network.

BACKGROUND INFORMATION

In general, a ring network is a network topology in which each node connects to exactly two other nodes, forming a single continuous pathway for signals through each node—a ring. Data travels from node to node, with each node along the way handling every packet. Rings can be unidirectional, with all traffic travelling either clockwise or anticlockwise around the ring, or bidirectional.

For example, in an Ethernet network, a ring topology is formed by connecting a switches serving as relay devices in a ring shape (Ethernet is a registered trademark). In the ring topology, a plurality of switches (i.e., ring switches, or relay devices) are connected in a ring shape by two ports of each switch respectively connected to ports of adjacent switches. The switches and communication lines connecting the switches constitute a ring network capable of making a frame go around and come back (i.e., circulate the frame in/through the entire network).

Conventional problems include ID duplication and incorrect identification of abnormal sections.

SUMMARY

It is an object of the present disclosure to provide a relay device capable of correcting connection information representing (i) identification information of other relay device(s) connected in a ring network and (ii) a connection order of the other relay device(s) viewed from the relevant relay device.

A relay device according to one aspect of the present disclosure is used in a communication system in which a plurality of relay devices are connected in a ring shape. The relay device according to one aspect of the present disclosure is provided with a storage unit in which the connection information is stored. The connection information indicates (i) identification information of other relay device connected in a ring shape and (ii) a connection order of the other relay device as viewed from a subject relay device.

BRIEF DESCRIPTION OF THE DRAWINGS

Objects, features, and advantages of the present disclosure will become more apparent from the following detailed description made with reference to the accompanying drawings, in which:

FIG. 2 is a diagram of a configuration of an Ethernet frame;

DETAILED DESCRIPTION

Embodiments of the present disclosure will be described below with reference to the drawings.

1. First Embodiment

1-1. Configuration

Figure 1:
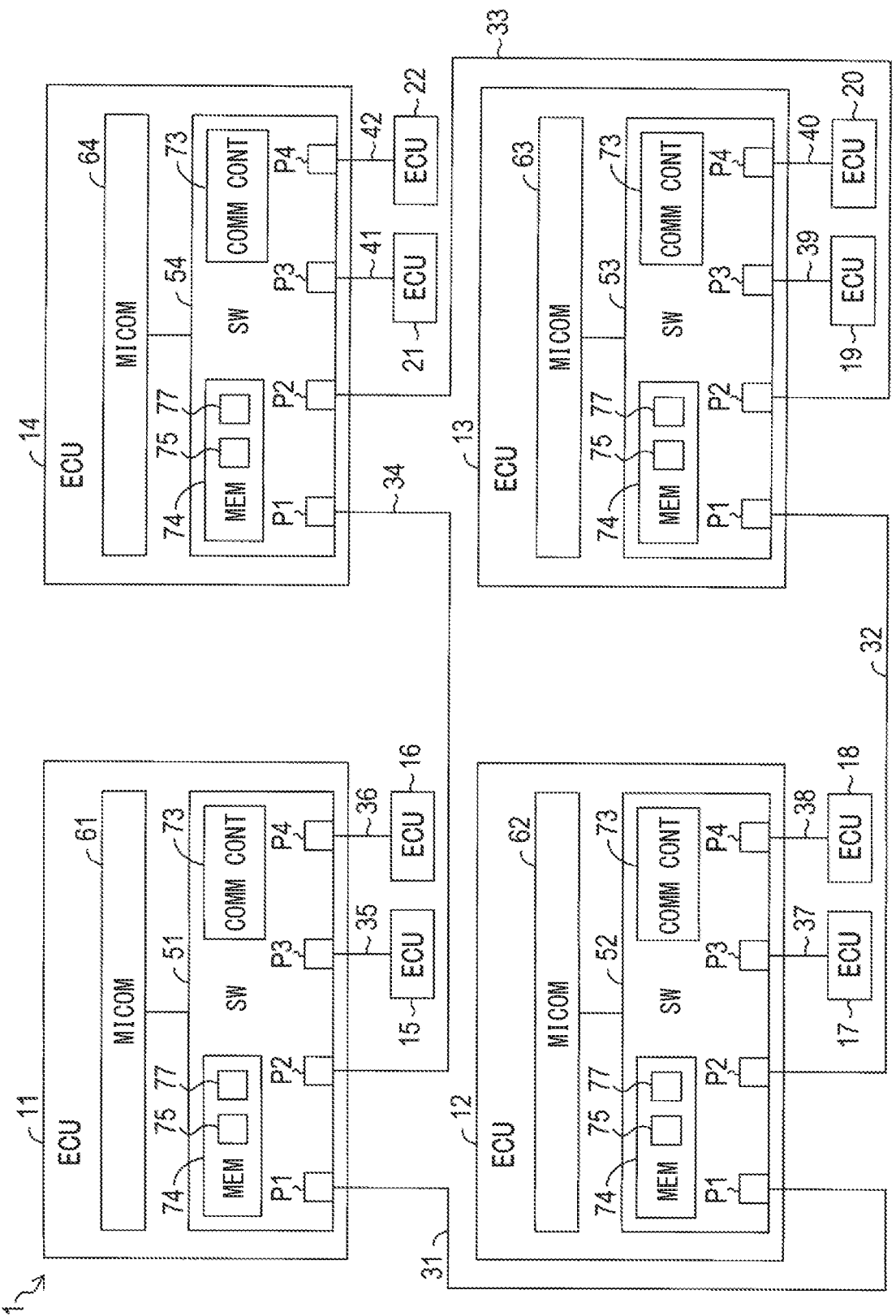
FIG. 1 is a diagram of a configuration of an in-vehicle communication network system according to a first embodiment.

An in-vehicle communication network system 1 according to the first embodiment shown in FIG. 1 includes ECUs 11 to 22 and communication lines 31 to 42 installed in a vehicle. The in-vehicle communication network system is, if simply called, an in-vehicle communication network or a communication system. ECU is an abbreviation of "Electronic Control Unit" representing an electronic control device. Examples of the ECUs 15 to 22 include an automatic driving ECU and an image processing ECU.

The ECUs 11 to 14 respectively include one of Ethernet switches 51 to 54 as a relay device for relaying communication with the other ECUs 15 to 22. Furthermore, the ECUs 11 to 14 respectively have one of microcomputers 61 to 64 as an arithmetic device. Although not illustrated, the microcomputers 61 to 64 respectively include a CPU, a ROM, a RAM, and the like.

The switches 51 to 54 perform communication for relaying according to the Ethernet standard. Each of the switches 51 to 54 includes four ports P1 to P4 for transmitting and receiving, and a communication control unit 73 for performing various processes including a relay process according to the Ethernet standard. P1 and P2 are ring ports used for ring network communication. P3 and P4 are normal ports. The number of switches is four in this example, but the number of switches may be other than four. Also, the number of ports is not limited to four, but may be other than four. A communication control unit 73 is configured by, for example, an integrated circuit or a microcomputer. The operations of the switches 51 to 54 are realized by the communication control unit 73.

In the in-vehicle communication network system 1, a port P1 of the switch 51 of the ECU 11 and a port P1 of the switch 52 of the ECU 12 are connected by a communication line 31. A port P2 of the switch 52 of the ECU 12 and a port P1 of the switch 53 of the ECU 13 are connected by a communication line 32. A port P2 of the switch 53 of the ECU 13 and a port P2 of the switch 54 of the ECU 14 are connected by a communication line 33. A port P1 of the switch 54 of the ECU 14 and a port P2 of the switch 51 of the ECU 11 are connected by a communication line 34.

In other words, the switches 51 to 54 are connected in a ring shape by connecting the ring ports to one ring port of a first adjacent switch, an to one ring port of a second adjacent switch. Therefore, the switches 51 to 54 and the communication lines 31 to 34 connecting the switches 51 to 54 constitute a ring network capable of making frames go one round in (i.e., circulate through) the network.

The ECUs 15 and 16 are connected to ports P3 and P4 of the switch 51 of the ECU 11 via communication lines 35 and 36, respectively. The ECUs 17 and 18 are connected to ports P3 and P4 of the switch 52 of the ECU 12 via communication lines 37 and 38, respectively. The ECUs 19 and 20 are connected to ports P3 and P4 of the switch 53 of the ECU 13 via communication lines 39 and 40, respectively. The ECUs 21 and 22 are connected to ports P3 and P4 of the switch 54 of the ECU 14 via communication lines 41 and 42, respectively. That is, among the ports P1 to P4 of the switches 51 to 54, the normal ports P3 and P4 (not used for the ring network) are connected to the ECUs 15 to 22 as communication terminals.

The communication paths between the switches 51 to 54 are, for example, two paths, i.e., (i) a counter-clockwise communication path in a transmission direction from the switch 51 to the switch 52, starting transmission of frames from the switch 51, and (ii) a clockwise communication path in a transmission direction from the switch 51 to the switch 54, starting transmission of frames from the switch 51. The two communication paths can function/serve as two communication paths for communication between the ECUs 15 to 22, which are connected to different switches 51 to 54. In other words, ECU 11 (including two ring ports) may serve as a communications center for ECU 15 and ECU 16.

Hereinafter, the communication lines 31 to 34 connecting the switches 51 to 54 may also be referred to as ring communication lines (or simply ring lines). Also, among the ports P1 to P4, the ports P1 and P2 used for the ring connection may also be referred to as ring ports. The ports other than the ring ports, that is, the ports P3 and P4 that are not used for the ring network may also be referred to as normal ports.

The frame communicated/transmitted in the in-vehicle communication network system 1 is, for example, an Ethernet frame shown in FIG. 2. The Ethernet frame includes a preamble, a destination MAC (i.e., Media Access Control) address, a sender MAC address, a type, data, and FCS (i.e., Frame Check Sequence). The preamble may include the start of frame delimiter (SFD) marking the end of the preamble, to total 8 bytes. The destination MAC address is the MAC address of the destination device of the frame, and corresponds to a destination address. The sender MAC address is a MAC address of a sender device of the frame, and corresponds to a sender address.

Each of the switches 51 to 54 is provided with a respective memory 74. The memory 74 stores at least a MAC address table 75. The MAC address table 75 of each of the switches 51 to 54 registers, for each port in the switch, the MAC addresses of the devices connected to the path extending from the port. For example, in the MAC address table 75 of the switch 51, a MAC address of the ECU 15 is registered for the normal port P3, and a MAC address of the ECU 16 is registered for the normal port P4. Further, MAC addresses of the ECUs 17 to 22 connected respectively to the normal ports P3 and P4 of the other switches 52 to 54 are registered for the ring ports P1 and P2 of the switch 51. This is because the ECUs 17 to 22 are connected respectively to the ends of the paths extending from the ring ports P1 and P2 of the switch 51 through the other switches 52 to 54. The registration of the MAC address in the MAC address table 75 is performed by, for example, a MAC address learning function of the respective switches 51 to 54.

Each of the switches 51 to 54 performs, for example, the following process as a relay process in the Ethernet. When a frame is received from any of the ports P1 to P4, a subject switch, i.e., one of the switches 51 to 54, determines a port to which the received frame is transferred (i.e., a transfer destination port), based on (i) the destination MAC address in the received frame and (ii) the MAC address table 75. Then, the received frame is transmitted from the port determined as described above as a transfer destination port.

For example, assume that the ECU 15 has transmitted a frame addressed to the ECU 19. The frame addressed to the ECU 19 is a frame including the MAC address of the ECU 19 as the destination MAC address. The frame transmitted from the ECU 15 includes the MAC address of the ECU 15 as the sender MAC address. Here, a frame addressed to the ECU 19 and transmitted from the ECU 15 is referred to as a frame f15-19.

In such case, the switch 51 receives the frame f15-19 from the port P3. When the switch 51 transmits the received frame f15-19 from the port P1 among the two ports P1 and P2, the frame f15-19 is input to the port P1 of the switch 53 via the switch 52, and is then transferred to the ECU 19 from the port P3 of the switch 53.

Further, an ID (i.e., Identification) as identification information of the switch is stored in the memory 74 of the respective switches 51 to 54. This ID is generated by random number processing, for example, and stored in the memory 74.

Further, a switch ID table 77 is also stored in the memory 74 of the respective switches 51 to 54. The switch ID table 77 of each of the switches 51 to 54 is a table indicating (i) the IDs of the other switches connected in a ring shape and (ii) a connection order of the other switches viewed from at least one of the ring ports P1 and P2 of the switch. That is, the switch ID table 77 records the contents of the switch of which ID is connected in which order as viewed from each of the ports P1 and P2 of the switch. The switch ID table 77 corresponds to connection information. Note that how to generate the switch ID table 77 is described later.

Figures 3, 4:
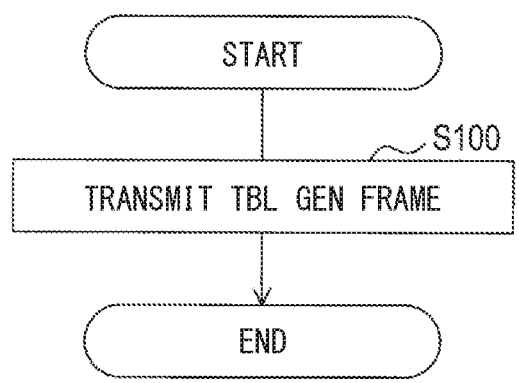
FIG. 3 is a diagram of an example of a switch ID table.
FIG. 4 is a flowchart of a table generating frame transmission process.

A switch ID table 77 of the switch 51 is illustrated in FIG. 3, for example. In addition, assuming that a code number assigned to a switch is "n" (i.e., 51 to 54), in FIG. 3 and the following description, an ID of the switch n is described as "IDn."

As shown in FIG. 3, in the switch ID table 77, for the respective ring ports P1 and P2, the IDs of the other switches are registered in the same order as the connection order of the other switches viewed from the ring ports. Therefore, in the switch ID table 77 of the switch 51, for example, the ID52 to ID54 of the other switches 52 to 54 are registered in the order of "ID52→ID53→ID54" for the port P1 of the switch 51 (counter-clockwise around the ring). For the port P2 of the switch 51, the ID52 to ID54 of the other switches 52 to 54 are registered in the stated order of "ID54→ID53→ID52" (clockwise around the ring).

In other words, the switch ID table 77 of each of the switches 51 to 54 represents the connection order of the other switches viewed respectively from the ring ports P1 and P2 by the order of ID registration. In the example of FIG. 3, the ID registered closer toward the left side of the table 77 is an ID of the other switch closer to the port P1 or P2.

Note that the switch ID table 77 may be a table in which, for only one of the two ring ports P1 and P2, the IDs of the other switches are registered in the same order as the closeness of the switches connected as viewed from the relevant ring port. In other words, the switch ID table 77 may be a table having only one row (not shown), i.e., only an upper row or only a lower row of the table 77 shown in FIG. 3. This is because, by reversing the order of the switches in one row, the order of the switches in the other row of the table 77 is known, in terms of connection order of the switches viewed from one of the two ring ports. In the switch ID table 77, the connection order of the switches may be represented by adding a sequence number to each switch ID.

1-2. Function to Detect Abnormality of Ring Communication Line

The switches 51 to 54 have an abnormality detection function for detecting an abnormal line from among the ring communication lines 31 to 34.

In order to detect an abnormal ring communication line from among the lines 31 to 34, one of the switches 51 to 54 functions as a master switch, and the other switches function as slave switches. Here, it is assumed that the switch 51 is a master switch. Further, an abnormality detection frame and an abnormality notification frame, which are described later, are frames transferred between the ring ports P1 and P2 of the switches 51 to 54. In other words, those frames flow/circulate in the ring-shape network.

The switch 51 as a master switch performs the following processes <1>, <2>, and <5>. The switches 52 to 54 respectively as slave switches perform the following processes <3>, <4>, and <5>. Thus, processes <1> and <2> are performed only by the master switch. Processes <3> and <4> are performed only by the slave switches. And process <5> is performed by the master switch and by the slave switches.

<1> Process <1> is performed only by the master switch. The switch 51 transmits an abnormality detection frame from one of the ring ports P1 and P2 at regular time intervals Ti. Here, it is assumed that an abnormality detection frame is transmitted from the port P1. The abnormality detection frame is, for example, a frame whose destination MAC address is a code indicating that the frame is an abnormality detection frame.

Note that the abnormality detection frame transmitted from the port P1 of the switch 51 circulates through, or goes around, the ring-shape network to return to the port P2 of the switch 51 by the process <3> performed respectively by the switches 52 to 54, which is described later. In addition, the fixed/regular time interval Ti, which is a transmission interval of the abnormality detection frame, is longer than a time required for the abnormality detection frame to go around (i.e., circulate through) the ring-shape network.

<2> Process <2> is performed only by the master switch. The master switch 51 determines whether any of (i) the abnormality detection frame and (ii) the abnormality notification frame has been received from the port P2 within a predetermined time T1 from the transmission of the abnormality detection frame. When neither of the abnormality detection frame nor the abnormality notification frame is received within the predetermined time T1, a master notification process described below is performed.

Note that the predetermined time T1 is longer than the time required for the abnormality detection frame to go around/circulate through the ring-shape network to return to the switch 51. Further, in the switch 51, a period/duration of the predetermined time T1 from the time of transmission of the abnormality detection frame corresponds to a period/duration of time within which the abnormality detection frame or the abnormality notification frame should be arriving at the switch 51.

<<Master Notification Process>>

The <<Master notification process>> is performed only by the master switch. The switch 51 identifies a switch that is connected first when viewed from the port P2 from the ID table 77 of the switch 51 (i.e., the switch 54). The switch is identified by identifying an ID of the switch. Then, for example, the switch 51 determines that an abnormality has occurred in the ring communication line 34 between the identified switch and the switch 51, then the switch 51 further notifies the other switches of such abnormal position by transmitting an abnormality notification frame including the ID of the switch 51 from the port P1. The abnormality notification frame is, for example, a frame whose destination MAC address is a code indicating that the frame is an abnormality notification frame.

<3> Process <3> is performed only by the slave switches. When the abnormality detection frame is received from one of the ports P1 and P2, the slave switches 52 to 54 respectively transmit the received abnormality detection frame from the other one of the ports P1 and P2, i.e., from a port different than an upstream ring port from which the abnormality detection frame has been received.

<4> Process <4> is performed only by the slave switches. The slave switches 52 to 54 respectively determine whether any of (i) the abnormality detection frame and (ii) the abnormality notification frame transmitted by the other switch has been received from the upstream ring port among the ports P1 and P2 within a predetermined time T2 from a reception of the abnormality detection frame. When it is determined that neither the abnormality detection frame nor the abnormality notification frame is received within the predetermined time T2, a slave notification process described below is performed.

Note that the predetermined time T2 is longer than the fixed/regular time Ti, which is the transmission interval of the abnormality detection frame described above. Further, in the switches 52 to 54, a period within the predetermined time T2 from the reception of the abnormality detection frame corresponds to a period within which the abnormality detection frame or the abnormality notification frame should be arriving from the preceding switch.

<<Slave Notification Process>>

The <<Slave notification process>> is performed only by the slave switches. The switches 52 to 54 respectively identify a switch (i.e., the preceding switch) that is connected first when viewed from the upstream ring port from the ID table 77 of the relevant switch. Then, the relevant switch determines that an abnormality has occurred in the ring communication line(s) between the identified preceding switch (upstream switch) and the relevant switch, from among the ring lines 31 to 34. Further, in order to notify the other switches of the abnormality, an abnormal notification frame including the ID of the relevant switch is transmitted (downstream) from one of the ports P1 and P2 which is different from the upstream ring port.

<5> Process <5> is performed by the master switch and by the slave switches. When the switches 51 to 54 respectively receive an abnormality notification frame transmitted by the other switch from one of the ports P1 and P2, the relevant switch transmits the received abnormality notification frame from a port different than the one that has received the abnormality notification frame. Further, the switches 51 to 54 respectively identify, from the ID table 77 of the relevant switch, a switch further ahead of the switch whose ID is included in the abnormality notification frame just received. That is, a switch one step further from the switch that has its ID included in the abnormality notification frame when viewed from one of the two ports P1, P2 receiving such frame is identified, with reference to the ID table 77 of the relevant switch. Then, it is determined that an abnormality has occurred in the ring communication line between the identified switch and the switch having the ID included in the abnormality notification frame from among the ring communication lines 31 to 34.

As described above, the switches 51 to 54 respectively use the switch ID table 77 to identify one or more abnormal ring communication lines 31 to 34, that is, an abnormal section of the ring-shape network. Further, each of the switches 51 to 54 has connection relation identifying information that can identify which ECU is connected to the normal port of which switch. Then, each of the switches 51 to 54, when relaying a frame (hereinafter, referred to as a relay target frame) destined for/addressed to an ECU connected to the normal ports P3 and P4 of the other switches, performs a process described below, after identifying the abnormal section of the network.

Each of the switches 51 to 54 identifies, based on the connection relation identifying information, a destination switch of the relay target frame, i.e., a switch having the destination ECU connected to the normal port thereof. Then, each of the switches 51 to 54 selects one of the ring ports P1 and P2 that can transmit a frame to the destination switch without passing through the abnormal section, based on the switch ID table 77, and transmits the relay target frame from the selected port. As described above, the switch ID table 77 is also used for a frame transfer that avoids an abnormal section.

1-3. Function to Generate Switch ID Table

Figure 5:
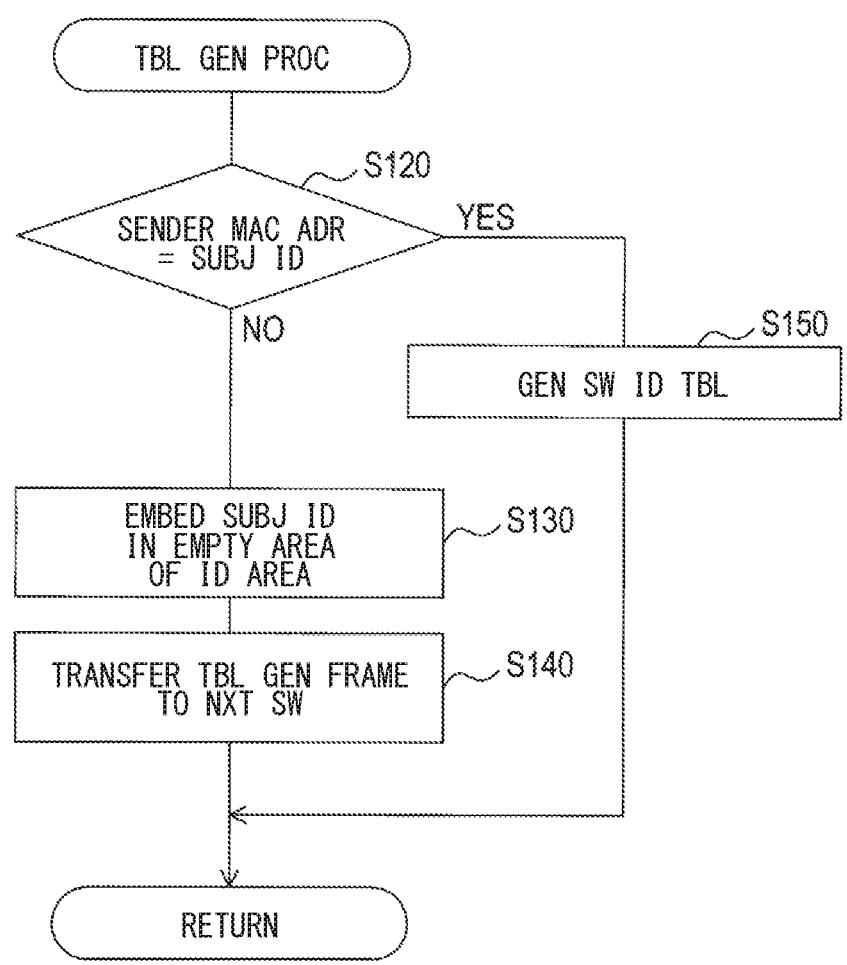
FIG. 5 is a flowchart of a table generation process.

Each of the switches 51 to 54 performs a table generating frame transmission process shown in FIG. 4 and a table generation process shown in FIG. 5 as a process for generating the switch ID table 77. Note that the table generation process of FIG. 5 is performed as a subroutine, for example, in S250 of a first process of FIG. 6 described below.

1-3-1. Table Generating Frame Transmission Process

The switches 51 to 54 perform the table generating frame transmission process of FIG. 4 at regular intervals, for example. Then, in S100 of the table generating frame transmission process, the switches 51 to 54 transmit a table generating frame from one of the ring ports P1 and P2 of the relevant switch.

The table generating frame is, for example, a frame whose destination MAC address is a code indicating that it is a table generating frame. The table generating frame circulates in the ring network, similarly to the above-described abnormality detection frame and abnormality notification frame.

The ID of the sender switch is stored as the sender MAC address in the table generating frame. The data area (i.e., payload) of the table generating frame is used as an ID area for storing IDs of a plurality of switches. The ID area is empty at the time of transmission from the sender switch. The ID area corresponds to an area for storing identification information.

Note that the switches 51 to 54 may be configured to transmit a table generating frame from each/both of the ring ports P1 and P2.

1-3-2. Table Generation Process (when Table Generating Frame Received)

The switches 51 to 54 perform the table generation process shown in FIG. 5 when a table generating frame is received from any of the ring ports P1 and P2. A switch presently receiving the table generating frame (and performing the table generating process) may be called a subject switch or a receiving switch.

As shown in FIG. 5, when one of the switches 51 to 54 starts the table generation process (after receiving a table generating frame), in S120, the subject switch determines whether or not the received table generating frame includes their subject ID. Specifically, it is determined whether or not the sender MAC address of the table generating frame (the address of the switch that initiated/created/sent the abnormality detection frame) is the subject ID of the subject switch. In other words, whether or not the sender MAC address of the table generating frame is the ID of the receiving switch presently performing the table generation process.

If the receiving switch determines in S120 that the sender MAC address of the table generating frame is not its subject ID, then the receiving switch determines that the sender of the received table generating frame is another switch, and the process proceeds to S130.

In S130, the subject switch inserts its subject ID at a head of an empty area in the ID area of the received table generating frame. Subsequently in the S140, the subject switch transmits the table generating frame having the subject ID embedded therein from a ring port that is different from the ring port that received the table generating frame. In other words, the table generating frame is transferred to the next switch in the ring. After that, the switches 51 to 54 end the table generation process.

When the subject switch determines in S120 that the sender MAC address of the table generating frame is its subject ID, the process proceeds to S150. In such case, the received table generating frame has gone around/circulated through the entire ring network.

In S150, the subject switch generates the switch ID table 77 from (i.e., based on) the IDs of the other switches embedded in the ID area of the received table generating frame and the arrangement sequence of each ID.

Specifically, the subject switch reads the IDs of the other switches from the ID area of the received table generating frame in the order in which they were inserted. The IDs read from the ID area is collectively called as an "ID group." Then, the switches 51 to 54 perform the following processes, i.e., first and second registration process.

<<First Registration Process>>

Of the ring ports P1 and P2, one that is different from the port that has received the table generating frame, that is, the one that transmitted the table generating frame, registers the read ID group as it is as the switch ID table 77. In otherwords, the ID group from a table generating frame sent from ring port P1 of switch 51 may read ID52→ID53→ID54 for a counter-clockwise path, as shown in the upper half of FIG. 3.

<<Second Registration Process>>

Of the ring ports P1 and P2, one that has received the table generating frame registers, as the switch ID table 77, the read ID group with a reversely-ordered ID arrangement sequence. In other words, for ring port P2 of switch 51, we reverse the order of the ID group for a clockwise path to read ID54→ID53→ID52, as shown in the bottom half of FIG. 3.

For example, it is assumed that the switch 51 has transmitted a table generating frame from the port P1 in S100 of FIG. 4.

Then, the switch 52 receives the table generating frame transmitted by the switch 51 from the port P1, and performs the process of S130 and S140 in FIG. 5. Therefore, the switch 52 embeds the ID of the switch 52 (i.e., the ID52) at the head of the empty area in the ID area of the received table generating frame, and transmits the table generating frame having the ID52 embedded therein from the port P2 of the switch 52.

The switch 53 receives the table generating frame transferred from the switch 52 from the port P1, and performs the process of S130 and S140 in FIG. 5. Therefore, the switch 53 transmits, from the port P2, the table generating frame in which the ID of the switch 53 (i.e., the ID53) is added to the ID area. For example, ID53 is added immediately after the ID52).

The switch 54 receives the table generating frame transferred from the switch 53 from the port P2, and performs the process of S130 and S140 in FIG. 5. Therefore, the switch 54 transmits the table generating frame in which the ID of the switch 54 (i.e., the ID54) is added to the ID area from the port P1.

Then, the switch 51 receives the table generating frame transferred from the switch 54 from the port P2, which has the sender MAC address of the subject switch, i.e., the ID of the switch 51 (i.e., the ID51).

Therefore, the switch 51 generates the switch ID table 77 shown in FIG. 3 by performing the process of S150 shown in FIG. 3. In other words, for the port P1, the ID52 to ID54 of the other switches 52 to 54 are registered in the order of "ID52→ID53→ID54" by the above-described first registration process. For the port P2, the ID52 to ID54 are registered in the order of "ID54→ID53→ID52" by the above-described second registration process.

Similarly, the other switches 52 to 54 generate the switch ID table 77 by performing the process of FIG. 4 (each creating a respective table generating frame) and the process of S150 of FIG. 5 (each creating a respective switch ID table for itself).

1-4. Processes for Correcting Switch ID Table when ID is Duplicated

The switches 51 to 54 may, for some reason such as process error or noise, store the subject ID (i.e., an ID assigned to one switch) also as an ID of an other switch. In other words, ID duplication may occur. When ID duplication occurs, in a switch having no ID duplication, the same ID may be registered as an ID of a first switch and also as an ID of another switch in the switch ID table. For example, in FIG. 4 the switch ID table for ring port P1 of switch 51 may be: ID52→ID52→ID54 (instead of ID52→D53→ID54). Further, in a switch having ID duplication, the sender of the table generating frame cannot be identified, thereby the generation of the switch ID table itself may not be performed properly. For example, in FIG. 4 the switch ID table for ring port P1 of switch 51 may be: ID51→ID53→ID54 (instead of ID52→ID53→ID54). When ID duplication occurs as described above, the switch ID table may not be correct in the switches 51 to 54, and a correct result cannot be obtained as a result of the process that uses the switch ID table. For example, an abnormal section of the network cannot be properly identified, or frame transfer that avoids the abnormal section cannot be properly performed.

Therefore, in the present embodiment, in order to eliminate ID duplication and correct the switch ID table when ID duplication occurs, each of the switches 51 to 54 performs the first process to the fourth process shown in FIGS. 6 to 9.

1-4-1. First Process (Anti-Duplication)

Figure 6:
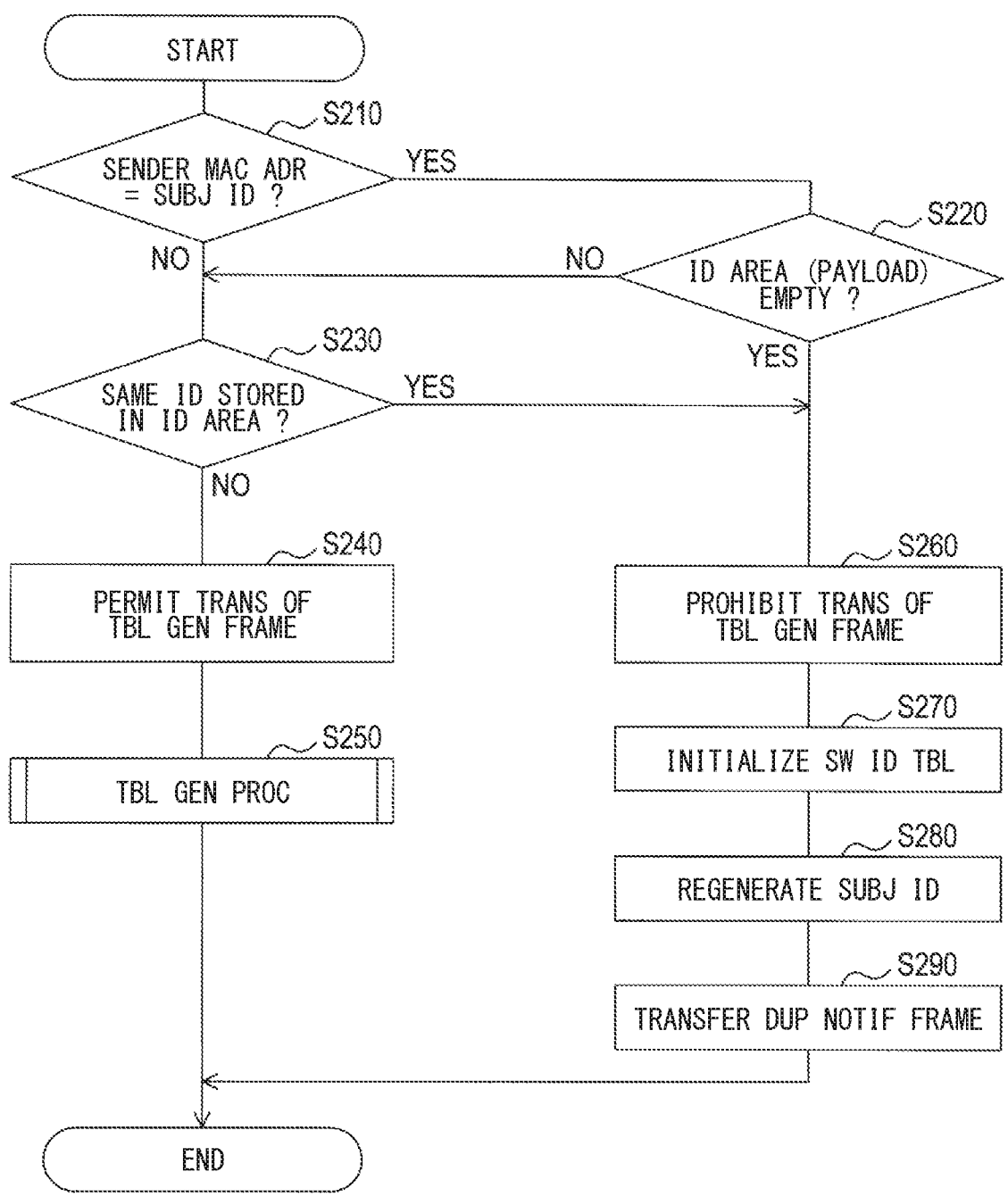
FIG. 6 is a flowchart of a first process.

The switches 51 to 54 each perform the first process shown in FIG. 6 when receiving the above-described table generating frame.

In FIG. 6, when the switches 51 to 54 start the first process, in S210, the switches 51 to 54 determine whether or not the sender MAC address of the received table generating frame is their subject ID (i.e., an ID of the receiving/subject switch). If it is determined that the sender MAC address is the subject ID, the process proceeds to S220. For example, switch 51 receives a table generating frame, then determines in step S210 that the sender MAC address is ID51 ("YES"), then proceeds rightward and downward to step S220.

Continuing the example, in S220 switch 51 determine whether or not the ID area (i.e., the payload) of the received table generating frame is empty. If the ID area is not empty, the process proceeds to S230. Here, "empty" means that no switch ID is stored. This indicates an error, because a table generating frame in this situation (initially generated by the switch that is now receiving) should have at least one ID in the ID area.

Additionally switch 51 also proceeds to S230 after determining in S210 that the sender MAC address of the received table generating frame is not ID51. In S230, switch 51 determines whether or not the same ID as the subject ID is stored in the ID area of the received table generating frame. If it is determined that the same ID is not stored, the process proceeds to S240 based on a determination of no ID duplication. Here, "no ID duplication" means that no ID duplication has occurred.

In step S240, switch 51 permits transmission of the table generating frame in S240. If the transmission of the table generating frame was previously prohibited by other process described later, then the transmission of the table generating frame is restarted/resumed with the permission in S240.

Then, subsequently in the S250, the switch 51 performs the above-described table generation process of FIG. 5, and subsequently ends the first process.

Further, when switch 51 determines in S220 that the ID area of the received table generating frame is empty, the switch 51 determines that ID duplication has occurred, and the process proceeds to S260. In such case, ID duplication would have occurred between the two adjacent switches, i.e., (i) the switch receiving the table generating frame and (ii) an adjacent switch connected to one of the ports P1 and P2 of the switch receiving the table generating frame (hereinafter referred to as an upstream adjacent switch). For example, in counter-clockwise rotation in FIG. 1, switch 54 and switch 51 have the same ID. This is a type 1 duplication error (or "upstream adjacent switch" error).

Note, there is another possible type of error here, which is that all intervening switches (52-54 in FIG. 1) omitted inserting their IDs into the data generating frame. Yet another possible type of error is that P1 of switch 51 is directly connected to P2 of switch 51, such that there is only one switch connected to itself. It is not clear whether this single self-connected switch is qualifies as a ring network, perhaps as a degenerate ring network. Note that Ethernet defines 3 as the minimum number of switches in an Ethernet ring network.

Further, the switches 51 to 54 also determine that ID duplication has occurred when it is determined in S230 that the same ID as the subject ID (i.e., the ID of the subject switch) is stored in the ID area of the received table generating frame, the process proceeds to S260. In such case, it is considered that the ID is duplicated between any of the switches other than the upstream adjacent switch and the subject switch. This is a type 2 duplication error, which is mutually exclusive with respect to type 1 duplication errors.

In other words, the processes of S210 to S230 in FIG. 6 are processes for determining the presence/absence of ID duplication. It may also be described as a process for determining whether or not a switch having the same ID as the subject switch is present in the in-vehicle communication network system 1. Then, among the switches 51 to 54, the switch that has determined that ID duplication has occurred by the process of S210 to S230 is a switch that has detected ID duplication. It should be noted that presence or absence of ID duplication may be determined by only one of the determination in S230 and the determinations in S210 and S220. In other words, it is possible to only search for one type of duplication error.

The switches 51 to 54 prohibit the transmission of the table generating frame in S260. Specifically, the switches 51 to 54 prohibit the table generating frame transmission process of FIG. 4. Then, the switches 51 to 54 initialize (i.e., delete) the switch ID table stored in the switch in S270, and re-generate their subject ID subsequently in S280. For example, in S280, a new subject ID is generated by random number processing, and the generated new subject ID is stored in the memory 74.

Subsequently in S290, the switches 51 to 54 transmit a duplication notification frame for notifying the other switches that ID duplication has occurred from at least one of the ring ports P1 and P2 of the switch, and end the first process.

The duplication notification frame is, for example, a frame in which the destination MAC address is a code indicating that it is a duplication notification frame. The duplication notification frame is also a frame flowing/circulating through the ring-shape network, similarly to the abnormality detection frame and the abnormality notification frame described above. Further, in the duplication notification frame, the new ID generated in S280 is stored as the ID of the sender switch. For example, the re-generated ID may be stored as the sender MAC address of the duplication notification frame, or may be stored in the data area of the duplication notification frame. Note that, in S290, the switches 51 to 54 may transmit the duplication notification frame from the ring port P1 or P2 which is different from the one from which the table generating frame was received, or may transmit the duplication notification frame from the port receiving the table generating frame. Further, the duplication notification frame may be transmitted from both of the ring ports P1 and P2.

In addition, when the switches 51 to 54 re-generate their subject ID in S280 in FIG. 6 and subsequently perform the process in S130 in FIG. 5, the switches 51 to 54 write (or insert) the re-generated new subject ID at the head of the empty area in the ID area of the received table generating frame.

1-4-2. Second Process

Figure 7:
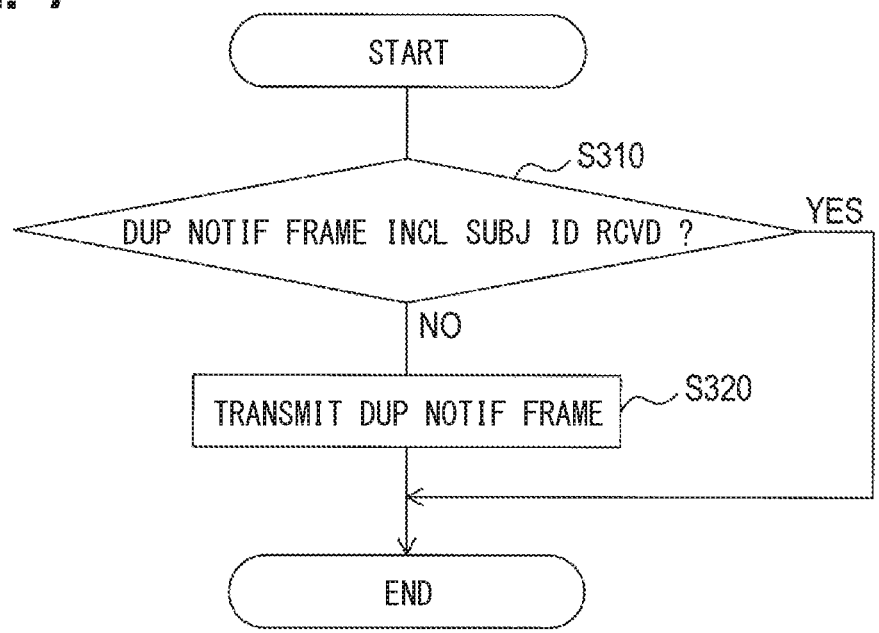
FIG. 7 is a flowchart of a second process.

The switches 51 to 54 perform the second process shown in FIG. 7 at predetermined intervals.

In FIG. 7, when the switches 51 to 54 start the second process, in S310, the switches 51 to 54 determine whether or not a duplication notification frame including the subject ID has been received from one of the ring ports P1 and P2. If the duplication notification frame including the subject ID has not been received, the process proceeds to S320. Then, in S320, the switches 51 to 54 transmit the same frame as the duplication notification frame transmitted in S290 of FIG. 6 from one of the ring ports P1 and P2, and subsequently end the second process. When the switches 51 to 54 determine in S310 that the duplication notification frame including the subject ID has been received, the switch 51 to 54 end the second process.

In other words, the switches 51 to 54 transmit the same duplication notification frame including the new subject ID re-generated in S280 of FIG. 6 at regular intervals, until the duplication notification frame transmitted from the subject switch goes around/circulates through the network and returns to the subject switch. For example, SW 51 received anew ID as SW 91 (ID91) during step S280 in FIG. 6. The duplication notification frame (with ID91 as the sender MAC address) passes from around the ring network until it reaches SW 91 (previously SW 51), then in step S310 of FIG. 7 the sender MAC address is the same as the subject address, then step S320 (transmittal) is skipped (not performed), then the duplication notification frame stops being transmitted.

Note that the switches 51 to 54 may transmit the duplication notification frame in S320 either (i) from the same one of the ring ports P1 and P2 that has transmitted the frame in S290 in FIG. 6, or (ii) from a different one of the ring ports P1 and P2 that has transmitted the frame in S290 in FIG. 6. Also, in S320, the duplication notification frame may be transmitted from both of the ring ports P1 and P2.

1-4-3. Third Process

Figure 8:
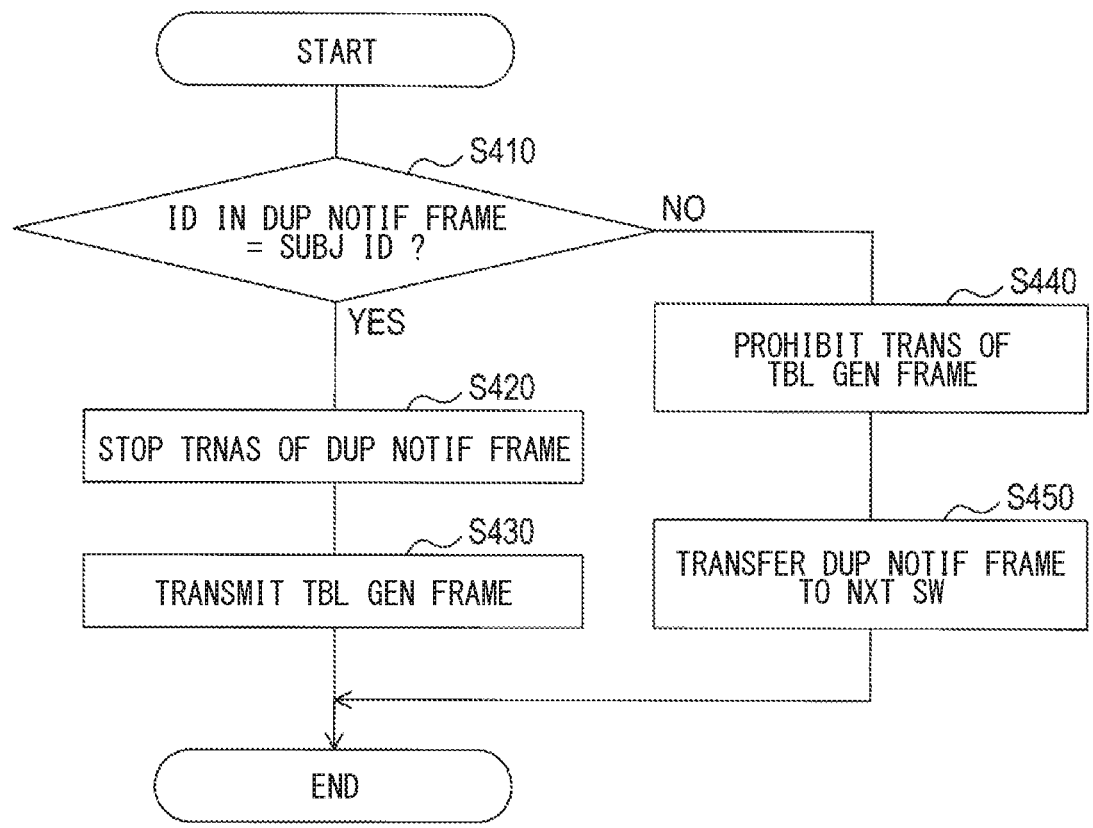
FIG. 8 is a flowchart of a third process.

The switches 51 to 54 perform the third process shown in FIG. 8 when receiving the duplication notification frame from any of the ring ports P1 and P2.

As shown in FIG. 8, when the switches 51 to 54 start the third process, in S410, the switches 51 to 54 determine whether or not the ID included in the received duplication notification frame is their subject ID, and if the ID in the duplication notification frame is the subject ID, the process proceeds to S420. That is, the process proceeds to S420 when the duplication notification frame transmitted from the sender has returned to the sender after going around/circulating through the network.

In S420, the switches 51 to 54 stop transmission of the duplication notification frame. Specifically, the switches 51 to 54 stop performing the second process shown in FIG. 7. Subsequently in S430, the switches 51 to 54 transmit the table generating frame from at least one of the ring ports P1 and P2 by performing the same process as in S100 of FIG. 4. In the table generating frame transmitted in S430, the new subject ID generated in S280 in FIG. 6 is stored as the sender MAC address. Then, the switches 51 to 54 end the third process after transmitting the table generating frame in S430. Note that in S430, the switches 51 to 54 may permit to perform the process in FIG. 4, which has been prohibited in S260 in FIG. 6. Further, a table generating frame storing a new subject ID as a sender MAC address may be transmitted by permitting to perform the process of FIG. 4 in S430.

When the switches 51 to 54 determine in S410 that the ID included in the received duplication notification frame is not their subject ID, that is, when receiving a duplication notification frame from a sender different from the subject switch, the process proceeds to S440.

In S440, the switches 51 to 54 prohibit the transmission of the table generating frame from the relevant switch. Specifically, the switches 51 to 54 prohibit performing the table generating frame transmission process in FIG. 4.

Then, subsequently in S450, the switches 51 to 54 transmit the received duplication notification frame from one of the ring port P1 or P2 which is different from the receiving port that has received the duplication notification frame. In other words, the duplication notification frame from the other switch is transferred to the next switch. Then, the switches 51 to 54 end the third process.

1-4-4. Fourth Process, FIG. 9

Figure 9:
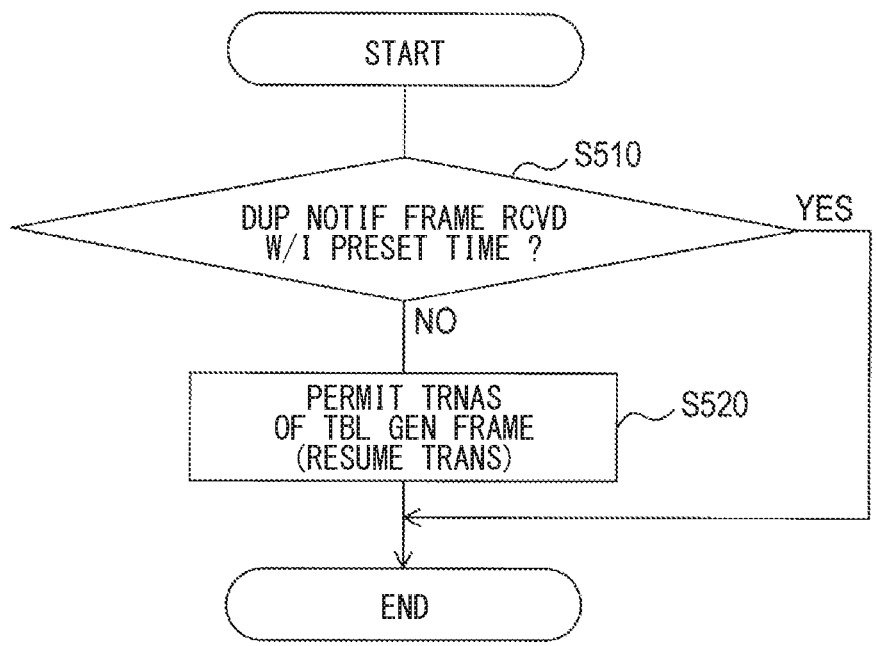
FIG. 9 is a flowchart of a fourth process.

When the switches 51 to 54 prohibit the transmission of the table generating frame from the relevant switch in S440 of FIG. 8 due to the reception of the duplication notification frame having the other switch as a sender, the switches 51 to 54 perform the fourth process shown in FIG. 9.

In FIG. 9, when the switches 51 to 54 start the fourth process, in S510, the switches 51 to 54 determine whether or not the relevant switch has received the duplication notification frame of having the other switch as a sender within a predetermined time Ts1 after starting the fourth process. When the duplication notification frame is received within the predetermined time Ts1, the fourth process ends. Note that the predetermined time Ts1 is set to be longer than a cycle in which the second process of FIG. 7 is performed, that is, a cycle in which the switch that has detected the ID duplication repeatedly transmits the duplication notification frame.

If the switches 51 to 54 determine in S510 that the relevant switch has not received the duplication notification frame having the other switch as a sender within the predetermined time Ts1, the process proceeds to S520 and permits transmitting the table generating frame from the relevant switch. Specifically, the switches 51 to 54 permit performing the table generating frame transmission process in FIG. 4. With the permission in S520, the transmission of the table generating frame is restarted/resumed. Then, the switches 51 to 54 end the fourth process.

In such manner, when the switches 51 to 54 receive the duplication notification frame from the other switch and prohibit the transmission of the table generating frame from the relevant switch, the switches 51 to 54 restart/resume the transmission of the table generating frame from the relevant switch in two cases. The first case is a case where a table generating frame is received from the other switch and the process of S240 in FIG. 6 is performed. The second case is a case where the process of S520 in FIG. 9 is performed after receiving no duplication notification frame from the other switch for the predetermined time Ts1 or more.

1-5. Example of Operation

For a first example, it is assumed that the IDs stored in the switches 52 and 54 have been somehow duplicated. For example, switches 52 and 54 both store ID52 in their respective memory 74. Then, in a state where such ID duplication has occurred, for example, the switch 51 transmits a table generating frame from the port P1.

The table generating frame transmitted from the switch 51 is transmitted counterclockwise through the ring-shape network and reaches the port P2 of the switch 54 via the switches 52 and 53. When the switch 54 receives the table generating frame having the switch 51 as a sender, the switch 54 performs the first process of FIG. 6, determines "NO" in S210, and determines "YES" in S230, thereby detecting ID duplication. This is because the same ID as that of the switch 54 is stored by the switch 52 in the ID area of the table generating frame transmitted from the switch 51 to the switch 54. As a second example, assuming that ID duplication occurs between the switch 53 and the switch 54 and the switch 53 transmits a table generating frame from the port P2, the switch 54 determines "YES" in S210 and S220 in FIG. 6, thereby detecting ID duplication. Specifically, this second example is an "immediately adjacent duplication error" (type 1 error), and is different that the error in the first example (type 2 error).

Then, the switch 54 that has detected ID duplication performs the processes S260 to S290 in FIG. 6. Therefore, the switch 54 prohibits transmission of the table generating frame from the switch 54, initializes the switch ID table, and generates a new subject ID (such as ID54new, preferably different than the previous ID54, although there is a small chance that a random number generator may generate an identical ID, this possibility may result in additional generations until a new ID is generated). Then, in order to notify other switches 51 to 53 of the occurrence of ID duplication, a duplication notification frame including the new subject ID is transmitted from at least one of the ring ports P1 and P2 of the switch 54 (ID54new). In this example, it is assumed that a duplication notification frame is transmitted from the port P1 of the switch 54.

Then, the switch 51 receives the duplication notification frame having the switch 54 (ID54new) as a sender from the port P2, performs the third process of FIG. 8, determines "NO" in S410, and performs the process of S440 and S450. Therefore, the switch 51 prohibits the transmission of the table generating frame from the switch 51. Then, the received duplication notification frame is transferred from the port P1 to the next switch 52.

The switch 52 receives the duplication notification frame transmitted by the switch 54 as a sender (i.e., originated from the switch 54) from the port P1, performs the third process of FIG. 8, determines "NO" in S410, and performs the process of S440 and S450. Therefore, the switch 52 also prohibits transmission of the table generating frame from the switch 52. Then, the received duplication notification frame is transferred from the port P2 to the next switch 53.

The switch 53 receives the duplication notification frame transmitted by the switch 54 as a sender from the port P1, performs the third process in FIG. 8, determines "NO" in S410, and performs the process of S440 and S450. Therefore, the switch 53 also prohibits transmission of the table generating frame from the switch 53. Then, the received duplication notification frame is transferred from the port P2 to the next switch 54.

Then, the switch 54 receives the duplication notification frame including the re-generated new subject ID (ID54new) and having the switch 54 as a sender from the port P2, and performs the third process of FIG. 8. Then, the switch 54 determines "YES" in S410 of FIG. 8 and performs the process of S420 and S430. Therefore, the switch 54 (after the duplication notification frame completes transmission through the whole ring, and returns to the creator/originator of the duplication notification frame) stops transmission of the duplication notification frame, and transmits a table generating frame including the re-generated new subject ID as a sender MAC address from at least one of the ring ports P1 and P2.

On the other hand, in case that the other switches 51 to 53 receive the table generating frame having the switch 54 as a sender when the transmission of the table generating frame is prohibited in accordance with the reception of the duplication notification frame, the other switches 51 to 53 perform the first switch of FIG. 6. Then, the process of S240 and S250 is performed by determining "NO" in S210 and S230 of FIG. 6.

Therefore, the switches 51 to 53 permit and restart/resume the transmission of the table generating frame, and perform the table generation process of FIG. 5. In such case, the switches 51 to 53 determine "NO" in S120 of FIG. 5 and perform the process of S130 and S140.

Therefore, the table generating frame transmitted by the switch 54 returns to the switch 54 after a round trip of the ring network, by the process of S130 and S140 in FIG. 5 performed by the switches 51 to 53. Then, the switch 54 generates the switch ID table from the ID group stored in the ID area of the table generating frame coming back from the round trip of the network.

Further, each of the other switches 51 to 53 also transmits the table generating frame, and re-generates the switch ID table from the ID group stored in the ID area of the table generating frame returned from the round trip of the ring network.

Here, when the switch 54 receives the table generating frame having the other switches 51 to 53 as a sender and performs the process of S130 in FIG. 5, the switch 54 writes, in the ID area of the received table generating frame, the generated new subject ID (ID54new). Therefore, in the switch ID tables generated by the other switches 51 to 53, an ID different from the ID of the switch 52 is recorded as the ID of the switch 54. Therefore, the switch ID tables of the switches 51 to 54 are corrected and thus have no ID duplication.

1-6. Effect

According to the first embodiment described in detail above, the following effects are obtained. (1a) When the switches 51 to 54 detect the ID duplication by the process of S210 to S230 in FIG. 6, that is, when it is determined that a switch having the same ID as that of the other switch exists in the in-vehicle communication network system 1, a new subject ID (such as ID54new) is generated in S280 of FIG. 6. In other words, a subject switch detecting ID duplication (with respect to its own ID) changes its subject ID, thereby eliminating ID duplication. Then, the subject switch subsequently transmits the table generating frame including the re-generated new subject ID from at least one of the ports P1 and P2 in S430 of FIG. 8.

The table generating frame from the subject switch that has detected the ID duplication goes around the ring network while recording the ID of each of the other switches recorded respectively by the other switch, and returns to the subject switch that has detected the ID duplication. Then, the subject switch that has detected the ID duplication generates a new switch ID table and stores it in the memory 74 by the process of S150 in FIG. 5.

Further, when the subject switch that has detected the ID duplication receives the table generating frame having the other switch as a sender after generating its new subject ID (such as ID54new), the switch embeds the re-generated new subject ID in the ID area of the table generating frame in S130 of FIG. 5. Therefore, in the other switch that is the sender of the table generating frame, a switch ID table in which the generated new ID is recorded as an ID of the ID duplication detected switch is generated and stored in the memory 74.

Therefore, even if ID duplication occurs, a switch ID table in which ID duplication has been eliminated is generated and stored in each of the switches 51 to 54. In other words, the switch ID table stored/held in each of the switches 51 to 54 is correctable.

(1b) When detecting the ID duplication, the switches 51 to 54 transmit the duplication notification frame including the re-generated new subject ID in S290 of FIG. 6 before transmitting the table generating frame, from at least one of the ring ports P1 and P2. Subsequently, when a duplication notification frame including the new subject ID is received from any of the ring ports P1 and P2, the table generating frame is transmitted in S430 of FIG. 8.

Further, when the switches 51 to 54 receive the duplication notification frame having the other switch as a sender from one of the ring ports P1 and P2, the switches 51 to 54 prohibit the transmission of the table generating frame in S440 of FIG. 8. Then, in S450 of FIG. 8, the received duplication notification frame is transmitted from one of the ring ports P1 and P2 that is different from the receiving port that has received the duplication notification frame. Subsequently, transmission of the table generating frame from the switch is restarted/resumed on condition that the table generating frame is received. The transmission restart is realized by the process of S240 in FIG. 6.

Therefore, among the switches 51 to 54, the subject switch that has detected the ID duplication enables the other switches to prohibit the transmission of the table generating frame by the duplication notification frame, and to transmit the table generating frame therefrom. Then, the subject switch detecting the ID duplication transmitting the table generating frame, causes the other switches to resume transmission of the table generating frame.

Therefore, among the switches 51 to 54, the switch that has detected the ID duplication and has re-generated its subject ID is enabled to transmit the table generating frame first, and then makes the other switches transmit the table generating frame. In other words, when any of the switches 51 to 54 detects the ID duplication, the switch that has detected the ID duplication first transmits a table generating frame for re-generating a switch ID table having no ID duplication. Then, in switches other than the switch that has detected the ID duplication, the reception of the duplication notification frame is used as a trigger to recognize that, during a period from the reception of the duplication notification frame to the re-generation of the switch ID table, the switch ID table is not stored/held as a correct one. Therefore, during such period, for example, by stopping the process using the switch ID table, it is possible to suppress an inappropriate process result from being obtained.

(1c) Among the switches 51 to 54, a switch that has detected the ID duplication transmits the duplication notification frame in S290 of FIG. 6 and subsequently transmits, or keeps transmitting, the same duplication notification frame in S320 of FIG. 7 at regular intervals until receiving the duplication notification frame transmitted by the subject switch. Therefore, the reachability of the duplication notification frame to the other switches can be increased.

(1d) When the switches other than the switch that has detected the ID duplication among the switches 51 to 54 have prohibited the transmission of the table generating frame by receiving the duplication notification frame, those switches restart/resume transmission of the table generating frame also when determining "NO" in S510 of FIG. 9. In otherwords, the transmission of the table generating frame is restartable/resumable based not only on a satisfaction of a condition that "the table generating frame is received from the other switch" but also on a satisfaction of condition that "the duplication notification frame has not been received for the predetermined time Ts1 or more." Therefore, a situation in which transmission of the table generating frame is kept/left prohibited is preventable.

In the first embodiment, the table generating frame corresponds to the generating frame. The memory 74 corresponds to a storage unit. S100 in FIG. 4 corresponds to the process as a generating frame transmitter. Steps S130 and S140 in FIG. 5 correspond to process as a transfer processing unit. S150 in FIG. 5 corresponds to the process as a generating unit. S210 to S230 in FIG. 6 correspond to the process as a duplication determination unit. S280 and S290 in FIG. 6, steps S310 and S320 in FIG. 7, and S430 in FIG. 8 correspond to the process as a duplication elimination unit and a first duplication elimination unit. S440 and S450 in FIG. 8, S240 in FIG. 6, and S520 in FIG. 9 correspond to the process as a second duplication elimination unit.

2. Second Embodiment, FIGS. 10-13

2-1. Differences from First Embodiment

Since a basic configuration of the second embodiment is the same as that of the first embodiment, differences are described below. The same reference numerals as in the first embodiment denote the same components, and reference is made to the preceding description.

The in-vehicle communication network system 1 according to the second embodiment is different from the first embodiment in that the switches 51 to 54 further perform fifth to eighth processes shown in FIGS. 10 to 13.

2-2. Fifth to Eighth Processes

The fifth to eighth processes in FIGS. 10 to 13 correspond to a case where one of the switches 51 to 54 is reset, the ID and the switch ID table 77 in the memory 74 thereof are lost (for example, temporarily losing power when the memory is "volatile" memory that requires continuous power to maintain stored information, or alternatively by clearing a "nonvolatile" memory during a reset process), and then the relevant switch is restarted. Each of the above processes involves a process for correcting the switch ID table in each of the switches 51 to 54.

2-2-1. Fifth Process

Figure 10:
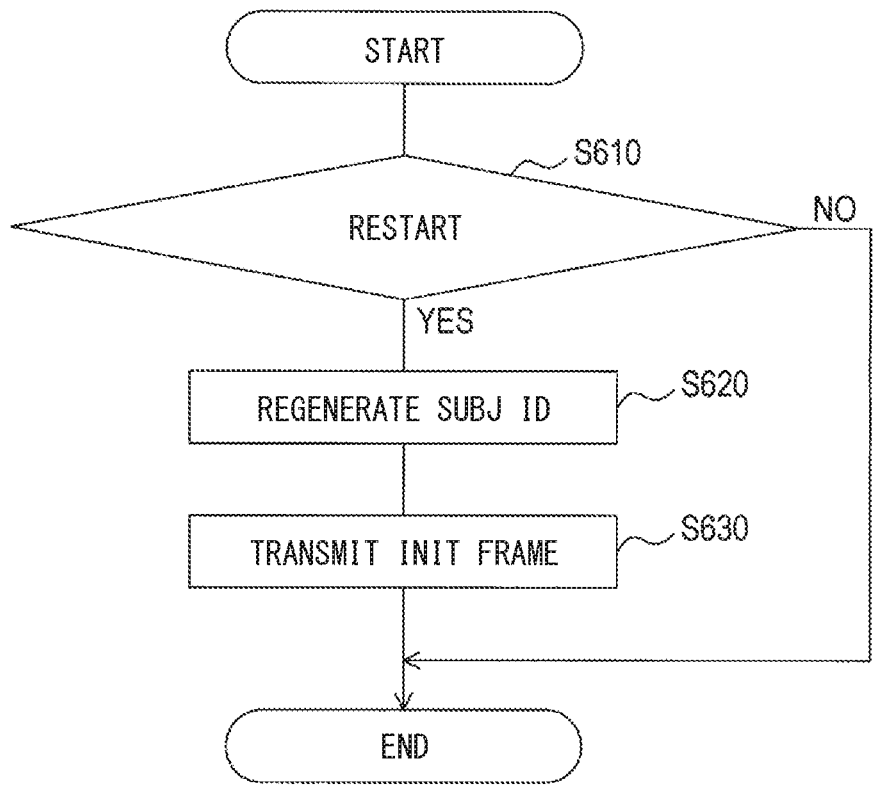
FIG. 10 is a flowchart of a fifth process performed in a second embodiment.

When started/re-started, the switches 51 to 54 perform a fifth process shown in FIG. 10. As shown in FIG. 10, when the switches 51 to 54 start the fifth process, in S610, the switches 51 to 54 determine whether or not they have been restarted from a reset. Specifically, it is determined whether the subject switch has been restarted after a reset in a state where the subject switch is a component of the in-vehicle communication network system 1 and the switch ID table has already been generated together with the other switches (i.e., the switch ID table has already been generated in all of the switches in the network system 1).

For example, in S610, it is determined whether or not the above-described abnormality notification frame has been received within a predetermined time after starting, and if the abnormality notification frame has been received, it may be determined that the system 1 has been restarted from a reset. The above determination is reasonable because, in the in-vehicle communication network system 1, when one of the switches 51 to 54 is reset, the reset switch (i.e., a switch being reset) becomes incapable of transmitting/receiving frames, which causes one of the other switches to determine the situation as a ring communication line abnormality and to transmit the abnormality notification frame. Also, for example, when the switch ID table is generated during operation, the switches 51 to 54 store a generation history indicating the table generation operation when a switch ID table is generated, in a storage such as a rewritable nonvolatile memory or a power-backed RAM, etc., i.e., in an operation history memory that does not lose memory contents by a reset. Then, in S610, the switches 51 to 54 determine whether or not a generation history is stored in the operation history memory. If a generation history is stored therein, the switches 51 to 54 determine that restart has been performed from a reset, and the generation history may be deleted subsequently.

If the switches 51 to 54 do not determine in S610 that they have restarted from a reset, the switches 51 to 54 end the fifth process. However, if the switches 51 to 54 determine that they have restarted from a reset, the process proceeds to S620.

In S620, the switches 51 to 54 generate a new subject ID by random number processing, for example, and store the generated new subject ID in the memory 74. Optionally, the subject switch may determine/verify that the new subject ID is different from the old subject ID. Then, subsequently in S630, the switches 51 to 54 transmit an initialization frame for notifying other switches of an initialization and a (new) generation of the switch ID table from at least one of the ring ports P1 and P2 of the switch, and end the fifth process subsequently.

The initialization frame may be, for example, a frame whose destination MAC address is a code indicating that the frame is an initialization frame. The initialization frame is also a frame flowing through the ring-shape network, just like the abnormality detection frame and the abnormality notification frame described above. In the initialization frame, the new ID generated in S620 is stored as the ID of the sender switch. For example, the new ID may be stored as the sender MAC address of the initialization frame, or may be stored in the data area of the initialization frame, or stored in both locations. Note that the switches 51 to 54 may transmit the initialization frame from one of the ring port P1 or P2 which is different from the port that has received the abnormality notification frame in S630, or the abnormality notification frame may be transmitted from one of the ring port P1 or P2 from the port that has received the abnormality notification frame. Further, the initialization frame may be transmitted from both of the ring ports P1 and P2.

Further, when performing the process of S130 of FIG. 5 after re-generating the subject IDs in S620 of FIG. 10, the switches 51 to 54 embed the re-generated new subject ID at the head of the empty area of the ID area of the received table generating frame.

2-2-2. Sixth Process, FIG. 11

Figure 11:
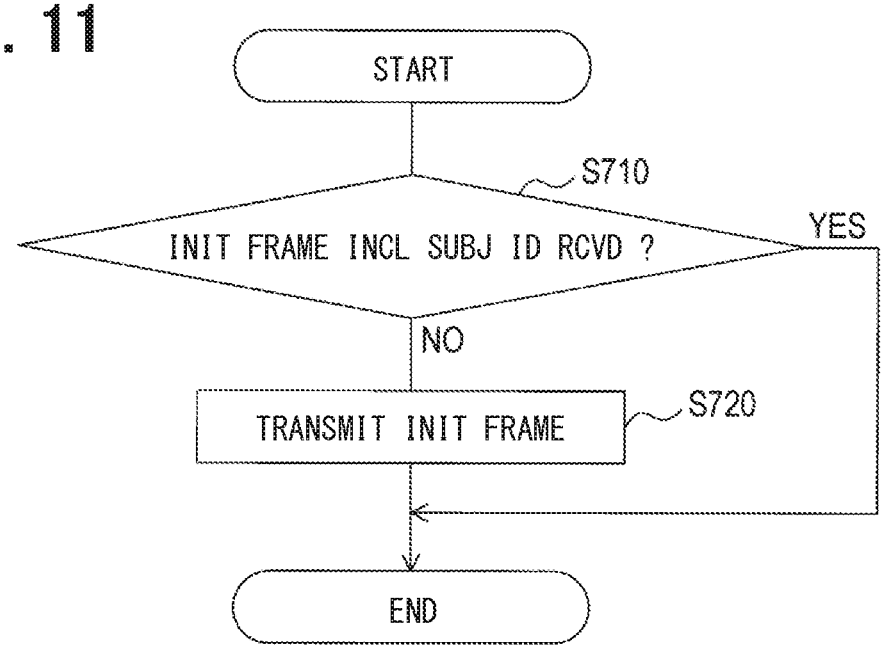
FIG. 11 is a flowchart of a sixth process performed in the second embodiment.

When transmitting the initialization frame in S630 of FIG. 10, the switches 51 to 54 perform a sixth process shown in FIG. 11 at predetermined intervals.

As shown in FIG. 11, when the switches 51 to 54 start the sixth process, the switches 51 to 54 determine in S710 whether or not an initialization frame including their subject ID has been received from one of the ring ports P1 and P2. If an initialization frame including the subject ID has not been received, the process proceeds to S720.

Then, in S720, the switches 51 to 54 transmit the same frame as the initialization frame transmitted in S630 of FIG. 10 from one of the ring ports P1 and P2, and subsequently end the sixth process. Alternatively, when the switches 51 to 54 determine in S710 that the initialization frame including the subject ID has been received, the switch 51 to 54 end the sixth process.

In other words, the switches 51 to 54 repeatedly transmit the initialization frame (i) including the new subject ID re-generated in S620 of FIG. 10 and (ii) indicating the relevant switch as a sender at regular intervals until such an initialization frame returns to the sender switch after making a round trip of the network.

Note that, in S720, the switches 51 to 54 may transmit the initialization frame from one of the ring port P1 or P2 which is the same as the port transmitted in S630 of FIG. 10, or may transmit the initialization frame in S630 of FIG. 10 from a port different therefrom. Further, in S720, the initialization frame may be transmitted from both of the ring ports P1 and P2.

2-2-3. Seventh Process, FIG. 12

Figure 12:
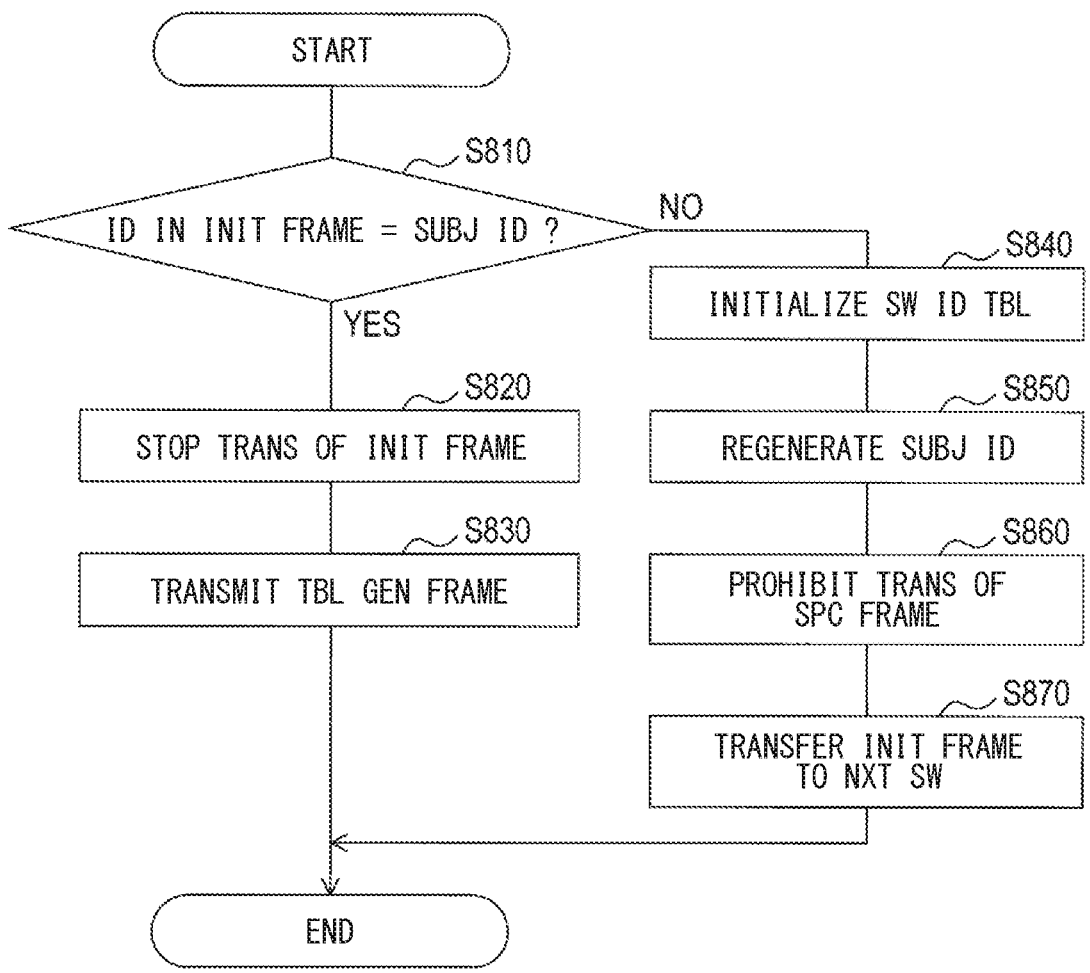
FIG. 12 is a flowchart of a seventh process performed in the second embodiment.

The switches 51 to 54 perform a seventh process shown in FIG. 12 when receiving the initialization frame from one of the ring ports P1 and P2.

In FIG. 12, when the switches 51 to 54 start the seventh process, in S810, the switches 51 to 54 determine whether or not an ID included in the received initialization frame is their subject ID. If an ID in the received frame is the subject ID of the relevant switch, the process proceeds to S820. That is, when the switches 51 to 54 receive an initialization frame having the relevant switch as a sender after a round trip of the network, the process proceeds to S820.

In S820, the switches 51 to 54 stop transmission of the initialization frame. Specifically, the sixth process shown in FIG. 11 is stopped. Subsequently in S830, the switches 51 to 54 transmit the table generating frame from at least one of the ring ports P1 and P2 by performing the same process as shown in S100 in FIG. 4. In the table generating frame transmitted in S830, the new subject ID re-generated in S620 of FIG. 10 is stored as the sender MAC address. After transmitting the table generating frame in S830, the switches 51 to 54 end the seventh process. Note that, in S830, by starting the process in FIG. 4, for example, a table generating frame in which a new subject ID is stored as the sender MAC address may be transmitted.

Further, when the switches 51 to 54 determine in above-described S810 that an ID included in the received initialization frame is not their subject ID, that is, when the received initialization frame is a frame from one of the other switches, the process proceeds to S840.

In S840, the switches 51 to 54 initialize (i.e., delete) the switch ID table stored in the switch, and generate their new subject ID subsequently in S850. For example, in S850, a new subject ID is generated by random number processing, and the generated new subject ID is stored again in the memory 74.

Then, subsequently in S860, the switches 51 to 54 prohibit the transmission of the specific frame from the relevant switch. The specific frame includes a table generating frame, at least. Furthermore, the specific frame may also include, for example, an abnormality detection frame and an abnormality notification frame.

Then, subsequently in S870, the switches 51 to 54 transmit the received initialization frame from one of the ring port P1 or P2 which is different from the port that has received the initialization frame. In other words, the initialization frame from the other switch is transferred to the next switch. Subsequently, the switches 51 to 53 end the seventh process.

2-2-4. Eighth Process, FIG. 13

Figure 13:
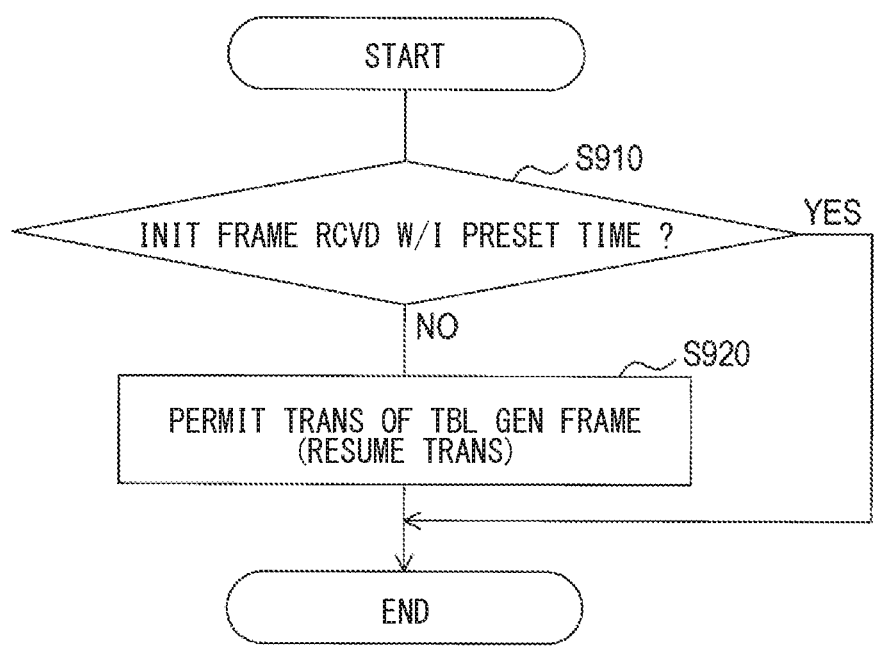
FIG. 13 is a flowchart of an eighth process performed in the second embodiment.

When the switches 51 to 54 has prohibited the transmission of the table generating frame from the relevant switch in S860 in FIG. 12 due to the reception of the initialization frame from a sender other than the relevant switch, the switches 51 to 54 perform an eighth process shown in FIG. 13 at predetermined intervals.

After starting the eighth process, as shown in FIG. 13, the switches 51 to 54 in S910 respectively determine whether or not an initialization frame from an other sender, i.e., a switch other than the relevant/subject switch, has been received within a predetermined time Ts2. When it is determined that the initialization frame has been received within the predetermined time Ts2, the switches 51 to 54 end the eighth process. Note that the predetermined time Ts2 is set to a time longer than a cycle in which the sixth process in FIG. 11 is performed, that is, a cycle in which the switch restarted from a reset repeatedly transmits the initialization frame.

When the switches 51 to 54 respectively determine in S910 that the initialization frame from the other sender has not been received within the predetermined time Ts2, the process proceeds to S920 to permit the transmission of a table generating frame from the relevant switch. With the permission in S920, the transmission of the table generating frame from the relevant switch is restarted. After that, the switches 51 to 54 end the eighth process. Note that, when the transmission of the abnormality detection frame and the abnormality notification frame is prohibited in S860 in FIG. 12, the transmission of these frames is permitted, for example, after the switch ID table is re-generated in the relevant switch.

Therefore, after receiving the initialization frame from the other switch and prohibiting the transmission of the table generating frame from the relevant switch, the switches 51 to 54 respectively restart the transmission of the table generating frame from the relevant switch in the third case or in the fourth case. (Recall that the first case and the second case were previously discussed above regarding the fourth process and FIG. 9.)

The third case is a case where a table generating frame is received from the other switch and the process of S240 in FIG. 6 is performed. The fourth case is a case where the process of S920 of FIG. 13 is performed after receiving no initialization frame from the other switch for the predetermined time Ts2 or more.

2-3. Operation Example

For example, it is assumed that the switch 54 among the switches 51 to 54 is reset and restarted.

The switch 54 is restarted (after a reset) and performs the fifth process of FIG. 10. Then, "YES" is determined in S610 of FIG. 10, and the process of S620 and S630 is performed. Therefore, the switch 54 generates its (new) subject ID. Then, in order to cause the other switches 51 to 53 to initialize and generate the (new) switch ID table, an initialization frame including the new subject ID is transmitted from at least one of the ring ports P1 and P2. In this example, it is assumed that an initialization frame is transmitted from the port P1 of the switch 54.

Then, the switch 51 receives the initialization frame transmitted by the switch 54 from the port P2, performs the seventh process of FIG. 12, determines "NO" in S810, and performs the processes of S840 to S870. Therefore, the switch 51 initializes the switch ID table, generates its new subject ID, and prohibits transmission of the table generating frame from the switch 51. Then, the received initialization frame is transferred from the port P1 to the next switch 52.

The switch 52 receives the initialization frame transmitted by the switch 54 from the port P1, performs the seventh process of FIG. 12, determines "NO" in S810, and performs the processes of S840 to S870. Therefore, the switch 52 also initializes the switch ID table, re-generates its subject ID, and prohibits transmission of the table generating frame from the switch 52. Then, the received initialization frame is transferred from the port P2 to the next switch 53.

The switch 53 receives the initialization frame transmitted by the switch 54 from the port P1, performs the seventh process of FIG. 12, determines "NO" in S810, and performs the processes of S840 to S870. Therefore, the switch 53 also initializes the switch ID table, generates its new subject ID, and prohibits transmission of the table generating frame from the switch 53. Then, the received initialization frame is transferred from the port P2 to the next switch 54.

Then, the switch 54 receives, from the port P2, the initialization frame including the new subject ID transmitted by itself (i.e., by the switch 54), and performs the seventh process in FIG. 12. Then, the switch 54 determines "YES" in S810 of FIG. 12 and performs the process of S820 and S830. Therefore, the switch 54 stops the transmission of the initialization frame, and transmits a table generating frame including the re-generated new subject ID as the sender MAC address from at least one of the ring ports P1 and P2.

On the other hand, when the other switch 51 to 53 are respectively prohibiting the transmission of the table generating frame in response to the reception of the initialization frame, the other switches 51 to 53 perform the first process of FIG. 6 when receiving the table generating frame from the switch 54 (i.e., the table generating frame having the switch 54 as a sender). Then, the process of S240 and S250 is performed by determining "NO" in S210 and S230 of FIG. 6.

Therefore, the switches 51 to 53 permit and restart/resume the transmission of the table generating frame, and perform the table generation process of FIG. 5. In such case, the switches 51 to 53 determine "NO" in S120 of FIG. 5 and perform the process of S130 and S140.

Therefore, the table generating frame transmitted by the switch 54 returns to the switch 54 after a round trip of the ring network, by the process of S130 and S140 in FIG. 5 performed by the switches 51 to 53. Then, the switch 54 generates the new switch ID table from the ID group stored in the ID area of the table generating frame coming back from the round trip of the network.

Further, each of the other switches 51 to 53 also transmits the table generating frame, and generates the new switch ID table from the ID group stored in the ID area of the table generating frame returned from the round trip/circulation of the ring network.

Here, when the switch 54 receives the table generating frame having the other switches 51 to 53 as a sender and performs the process of S130 in FIG. 5, the switch 54 embeds, in the ID area of the received table generating frame, the generated new subject ID. This also applies to the other switches 51 to 53. Therefore, the new switch ID tables of the switches 51 to 54 are generated as recording the new IDs re-generated by respective switches.

2-4. Effects

The second embodiment described above provides the effect (1a) according to the above described first embodiment and further provides the following effects.

(2a) When it is determined that the switches 51 to 54 have been restarted from a reset, their new subject IDs are generated in S620 of FIG. 10. Then, among the switches 51 to 54, a switch restarted from a reset generates its new subject ID, and subsequently transmits the table generating frame including the new subject ID from at least one of the ring ports P1 and P2 in S830 of FIG. 12.

The table generating frame from the restarted switch goes around the ring network while recording the IDs of the other switches respectively embedded by the other switches, and returns to the restarted switch. Then, the restarted switch generates the latest switch ID table and stores it in the memory 74 by the process of S150 in FIG. 5.

Further, when the restarted switch receives the table generating frame from the other sender after re-generating its subject ID, the restarted switch embeds the re-generated new subject ID in S130 of FIG. 5, in the ID area of the table generating frame. Therefore, in the other switch that is the sender of the table generating frame, a switch ID table in which the re-generated new ID is recorded as the ID of the restarted switch is generated and stored in the memory 74.

Therefore, even if the ID and the switch ID table are lost due to the reset in any of the switches 51 to 54, a new ID is generated when the relevant switch is restarted. Further, in each of the other switches, a switch ID table in which a new ID is recorded as the ID of the restarted switch is generated, and in the restarted switch, a switch ID table in which the IDs of all of the other switches in the network are recorded is generated. Therefore, the switch ID table held by each of the switches 51 to 54 is corrected.

(2b) When it is determined that the switches 51 to 54 have been restarted from the reset, before transmitting the table generating frame, in S630 of FIG. 10, the initialization frame including the generated new subject ID is transmitted from at least one of the ring ports P1 and P2. Subsequently, when the initialization frame including the new subject ID is received from one of the ring ports P1 and P2, a table generating frame is transmitted in S830 of FIG. 12.

Further, when the switch 51 to 54 receives the initialization frame from the other switch from one of the ring ports P1 and P2, the switch ID table is initialized (i.e., deleted) in S840 of FIG. 12, then, the transmission of the table generating frame is prohibited in S860 of FIG. 12. Then, in S870 of FIG. 12, the received initialization frame is transmitted from one of the ring port P1 or P2 that is different from the port that received the initialization frame. Subsequently, transmission of the table generating frame from the switch is restarted/resumed on condition that the table generating frame is received. This transmission restart is performed by the process of S240 in FIG. 6.

Therefore, the switch restarted from a reset causes, by using the initialization frame, the other switch to transmit the table generating frame therefrom after causing the other switches (i) to perform an initialization of the switch ID table and (ii) to prohibit the transmission of the table generating frame. Then, by the transmission the table generating frame from the restarted switch, transmission of the table generating frame from the other switches is restarted.

Therefore, when any of the switches 51 to 54 is restarted from a reset, transmission of a table generating frame is firstly performed by the other switch, for generating the new switch ID table in each of the switches 51 to 54. Then, in the switches other than the restarted switch, the switch ID table is initialized by receiving the initialization frame, and the new switch ID table is generated by the subsequent transmission and reception of the table generating frame. Therefore, in the in-vehicle communication network system 1, it is possible to suppress the mixture of the old and new switch ID tables, thereby securing/guaranteeing the accuracy of the process using the switch ID tables.

(2c) Among the switches 51 to 54, the switch restarted from a reset transmits the initialization frame in S630 of FIG. 10 and subsequently, at regular intervals until the switch receives the initialization frame transmitted by the switch itself, keeps transmitting the same initialization frame in S720 of FIG. 11. Therefore, the reachability of the initialization frame to the other switches can be increased.

(2d) When any of the switches 51 to 54 other than the switch restarted from the reset prohibits the transmission of the table generating frame by receiving the initialization frame, the switch restarts the transmission of the table generating frame, even after "NO" determination in S910 of FIG. 13. In other words, based not only on a satisfaction of a condition "the table generating frame is received from the other switch" but also on a satisfaction of a condition "the initialization frame has not been received for the predetermined time Ts2 or more," transmission of the table generating frame is restarted. Therefore, a situation in which transmission of the table generating frame is kept/left prohibited is preventable.

In the second embodiment, S610 in FIG. 10 corresponds to a process as a restart determination unit. S620 and S630 in FIG. 10, S710 and S720 in FIG. 11, and S830 in FIG. 12 correspond to a process as a re-generation processing unit and a first re-generation processing unit. S840, S860, and S870 in FIG. 12, S240 in FIG. 6, and S920 in FIG. 13 correspond to a process as a second generation processing unit.

3. Other Embodiments

Although the embodiments of the present disclosure have been described above, the present disclosure is not limited to the embodiments described above, and various modifications can be made to implement the present disclosure.

For example, in the first embodiment, when the switches 51 to 54 determine "NO" in S410 of FIG. 8, that is, when receiving a duplication notification frame of the other sender (i.e., from the other switch), the switches 51 to 54 may perform one or both of the initialization of the switch ID table and the re-generation of the subject ID.

Further, for example, in the second embodiment, when receiving the initialization frame from the restarted switch, the switches 51 to 54 may keep using the subject ID already stored therein without performing the process of S850 in FIG. 12, that is, without re-generating their subject IDs. Further, in S130 of FIG. 5, the ID embedded position in the empty area of the ID area of the table generating frame is not limited to the head of the empty area, but may be, for example, the end of the empty area. In such case, a plurality of IDs are sequentially embedded from the end toward the head of the ID area. Also, rules for how to embed an ID into the empty area of the ID area (i.e., from which position toward which position) may be arbitrarily determined as appropriate.

The switches 51 to 54 and relevant methods described in the present disclosure may be implemented/realized by programming a special purpose computer which is configured with a memory and a processor programmed to execute one or more particular functions embodied as computer programs. Alternatively, the switches 51 to 54 described in the present disclosure and the method thereof may be realized by a special purpose computer configured as a processor having one or more dedicated hardware logic circuits. Alternatively, the switches 51 to 54 and the method described in the present disclosure may be realized by one or more special purpose computers, which is a combination of (i) a programmable special purpose computer having a processor and a memory, which are programmed to perform one or more functions, and (ii) a hardware-logic special purpose computer having a processor with one or more hardware logic circuits. The computer programs may be stored, as instructions for performance by a computer, in a tangible, non-transitory computer-readable storage medium. The technique for realizing the functions of each unit included in the switches 51 to 54 does not necessarily need to include software, and all the functions may be realized using one or a plurality of hardware.

In addition, multiple functions of one component in the above embodiment may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted. Further, at least a part of the configuration of one of the above embodiments may be added to or substituted for the configuration of the other one of the above embodiments.

In addition to the switches 51 to 54 described above, the present disclosure can be realized in various forms, such as an in-vehicle communication network system including the switches 51 to 54 as components, a program for causing a computer to function as the switches 51 to 54, and a non-transitory, substantive memory medium such as a semiconductor memory storing the program, and a method of controlling a relay device.

What is claimed is:

1. A relay device for use in a communication system configured as a ring network of relay devices, the relay device comprising:

a storage unit for storing connection information indicating (i) identification information of other relay device connected to a subject relay device in the ring network and (ii) a connection order of the other relay device as viewed from the relay device;

and further comprising as functional units for generating the connection information, a generating frame transmitter configured to transmit a generating frame including the identification information of the subject relay device from at least one of two ring ports used for the ring network among a plurality of ports (P1 to P4) provided in the subject relay device;

a transfer processing unit, when receiving the generating frame from the other relay device by any of the ring ports, configured to transmit the received generating frame from a different one of the ring ports by which the generating frame was received, after writing the identification information of the subject relay device in an empty area of an identification information storage area of the received generating frame;

a generating unit, when receiving the generating frame from the subject relay device by any of the ring ports, configured to (a) generate the connection information based on (i) the identification information of the other relay device embedded in the identification information storage area of the received generating frame and (ii) an arrangement sequence of the written identification information and (b) store the generated connection information in the storage unit;

a duplication determination unit configured to determine whether a relay device having the same identification information as the subject relay device exists in the communication system based on the received generating frame;

a duplication elimination unit, when determined by the duplication determination unit that there is a duplication of the identification information, configured to (a) generate new identification information of the subject relay device, and subsequently (b) transmit the generating frame including the new identification information from at least one of the ring ports, wherein the transfer processing unit, after the new identification information is generated by the duplication elimination unit, writes the new identification information in the identification information storage area of the received generating frame.

2. The relay device according to claim 1, wherein:

the duplication elimination unit includes a first duplication elimination unit, the first duplication elimination unit is configured to transmit, when it is determined by the duplication determination unit that there is a duplication, a duplication notification frame including the new identification information from at least one of the ring ports prior to transmission of the generating frame, and subsequently to transmit the generating frame when the duplication notification frame including the new identification information is received from any of the ring ports, and the relay device includes a second duplication elimination unit configured to, when the duplication notification frame having an other relay device as a sender is received from any of the ring ports:

(i) prohibit the transmission of the generating frame by the generating frame transmitter and (ii) transmit the received duplication notification frame from a one of the ring ports that is different from the ring port receiving the generating frame, and subsequently (iii) restart the transmission of the generating frame by the generating frame transmitter on a condition that the generating frame is received from any of the ring ports.

3. The relay device according to claim 2, wherein the first duplication elimination unit is configured to transmit the duplication notification frame including the new identification information at regular intervals until the duplication notification frame including the new identification information is received.

4. The relay device according to claim 3, wherein the second duplication elimination unit, after prohibiting the transmission of the generating frame, is configured to restart the transmission of the generating frame on a condition that (i) the generating frame is received from any of the ring ports, or (ii) the duplication notification frame has not been received for a period of the predetermined time or more.

5. A relay device for use in a communication system configured as a ring network of relay devices, the relay device comprising:

a storage unit for storing connection information indicating (i) identification information of other relay device connected to a subject relay device in a ring shape and (ii) a connection order of the other relay device as viewed from the relay device;

and further comprising as functional units for generating the connection information, a generating frame transmitter configured to transmit a generating frame including the identification information of the relay device from at least one of two ring ports used for the ring network among a plurality of ports provided in the subject relay device;

a transfer processing unit, when receiving the generating frame from the other relay device by any of the ring ports, configured to transmit the received generating frame from a different one of the ring ports by which the generating frame was received, after writing the identification information of the subject relay device in an empty area of an identification information storage area of the received generating frame;

a generating unit, when receiving the generating frame having the subject relay device as a sender of the frame by any of the specific ports, configured to (a) generate the connection information based on (i) the identification information of the other relay device written in the identification information storage area of the received generating frame and (ii) an arrangement sequence of the written identification information and (b) store the generated connection information in the storage unit;

a restart determination unit configured to determine whether the subject relay device has restarted from a reset;

a generation processing unit, when determined by the restart determination unit that the subject relay device is restarted, configured to (a) generate new identification information of the subject relay device, and subsequently (b) transmit the generating frame including the r new identification information from at least one of the specific ports, wherein the transfer processing unit, after the identification information is generated by the generation processing unit, embeds the new identification information in the identification information storage area of the received generating frame, wherein the generation processing unit includes a first generation processing unit, the first generation processing unit is, when it is determined by the restart determination unit that a restart is performed, configured to (i) transmit the initialization frame including the new identification information from at least one of the ring ports prior to transmission of the generating frame, and subsequently (ii) transmit the generating frame when the initialization frame including the new identification information is received from any of the specific ports, and the relay device is further provided with a second generation processing unit configured to, when the initialization frame having an other relay device as a sender is received from any of the specific ports, (i) delete the connection information in the storage unit,
(ii) prohibit the transmission of the generating frame by the generating frame transmitter, and (iii) transmit the received initialization frame from the specific port, which is different from the one from which the initialization frame was received,
and subsequently
(iv) restart the transmission of the generating frame by the generating frame transmitter on a condition that the generating frame is received from any of the specific ports.

6. The relay device according to claim 5, wherein the first regeneration processing unit is configured to transmit the initialization frame including the new identification information at regular intervals until the initialization frame including the new identification information is received.

7. The relay device according to claim 6, wherein the second generation processing unit, after prohibiting the transmission of the generating frame, is configured to restart the transmission of the generating frame on a condition that (i) the generating frame is received from any of the ring ports, or (ii) the initialization frame has not been received for a period of the predetermined time or more.

8. An in-vehicle communication network comprising:
a relay device according to claim 1; and
an electronic control unit connected via a communication line to a normal port.

9. A subject switch for use in a ring network including the subject switch and at least two other switches, the switch comprising:
a communication controller;
a first ring port;
a second ring port; and
a memory including: a media access control (MAC) address table, and a switch identification (ID) table for storing at least a first connection order from one of the ring ports;
wherein the subject switch is associated with a subject switch ID and is configured to:
generate a table generating frame including at least: a preamble in a first zone, a destination MAC address in a second zone, a sender MAC address in a third zone, a type in a fourth zone, data in a fifth zone, and a frame check sequence (FCS) in a sixth zone; and
transmit the table generating frame;

wherein the switch is further configured to:
receive the table generating frame;
determine whether the sender MAC address in third zone identifies the subject switch;
upon a determination that the sender MAC address in third zone identifies the subject switch, generate new switch identification table; and
upon a determination that the sender MAC address in the third zone does not identify the subject switch, (i) write the subject switch ID in an empty area of an ID area in the fifth zone to modify the table generation frame, then (ii) transfer the modified table generation frame to a next switch of the other switcher,
further configured to perform a first process determining whether duplication occurs, wherein:
upon a determining that a first condition is satisfied and a second condition is satisfied, then the switch performs a first series of steps;
upon determining that a third condition is satisfied, then the switch performs the first series of steps;
upon a determination that the third condition is not satisfied, then the switch performs a second series of steps;
the first condition determines whether the sender MAC address in the third zone includes the subject switch ID;
the second condition determines whether the ID area in the fifth zone is empty;
the third condition determines whether the subject switch ID is stored in the ID area of the fifth zone;
the first series of steps includes:
prohibit transfer of any table generating frame,
initialize the switch identification table,
generate a new subject ID, and
transfer a duplication notification frame including the new subject ID as a sender MAC address in the duplication notification frame; and
the second series of steps includes:
permit transfer of the table generating frame, and
perform the table generating process.

10. The switch of claim 9, further configured to perform a second process including:
determine whether a received duplication notification frame includes the subject switch ID;
upon determining that the received duplication notification frame does not include the subject switch ID, then transmit the duplication notification frame.

* * * * *